2 Sheets—Sheet 2
G. F. HAWLEY.
HARVESTER.
No. 110,568. Patented Dec. 27, 1870.
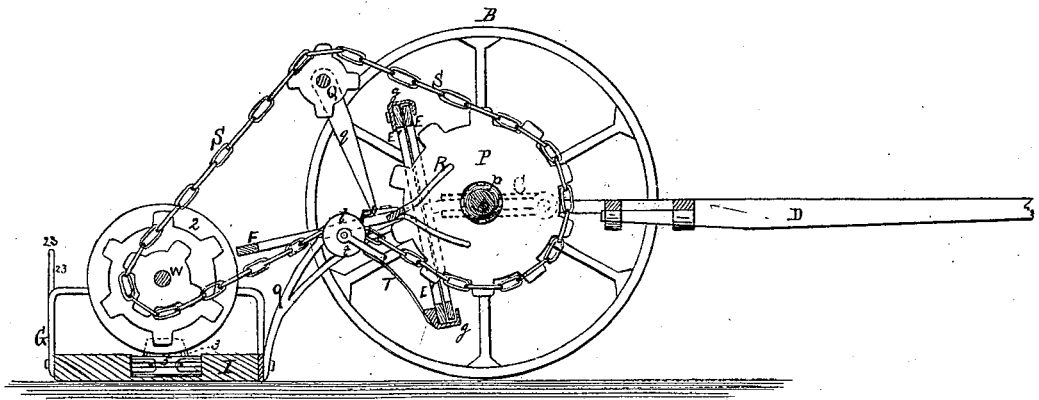
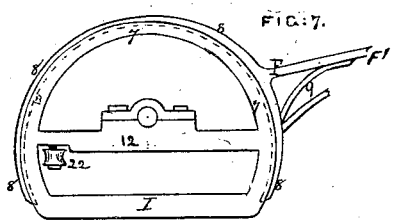
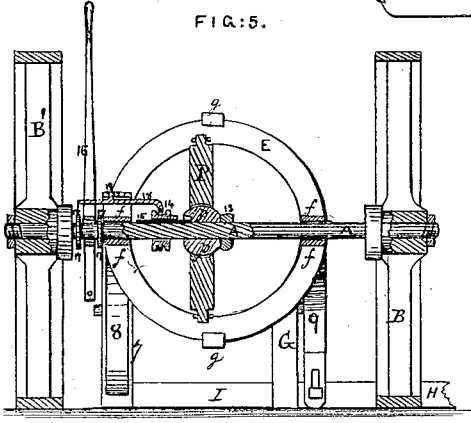
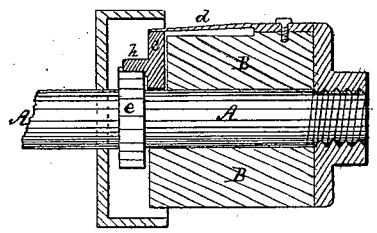
WITNESSES
H. H. Young
Joseph Bart
George F. Hawley
Inventor
By David A. Burr
Atty.

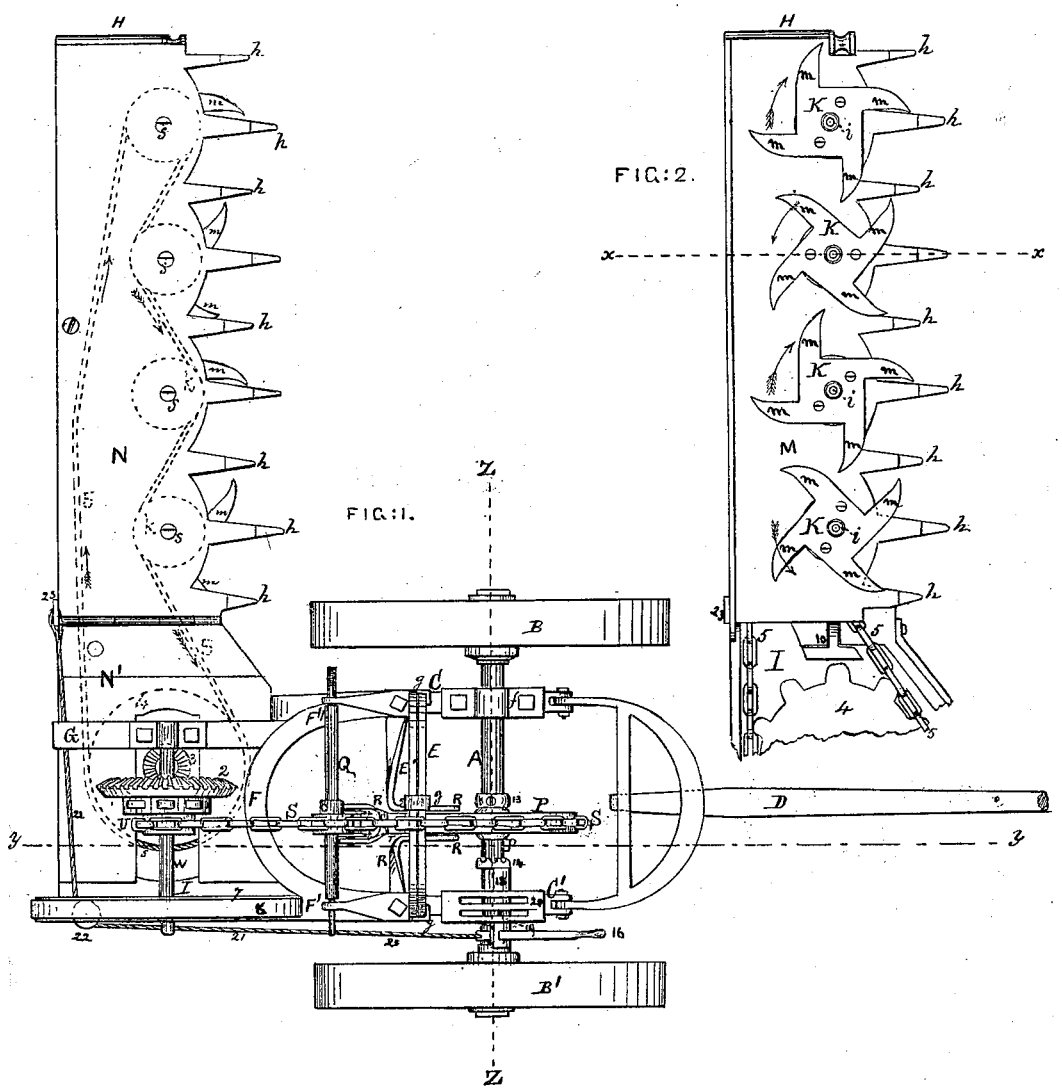

United States Patent Office.

GEORGE F. HAWLEY, OF GRAND RAPIDS, MICHIGAN.

Letters Patent No. 110,568, dated December 27, 1870.

IMPROVEMENT IN HARVESTERS.

The Schedule referred to in these Letters Patent and making part of the same.

I, GEORGE F. HAWLEY, of Grand Rapids, in the county of Kent and State of Michigan, have invented certain Improvements in Harvesters, of which the following is a specification.

Nature and Objects of the Invention.

My invention relates to improvements in that class of harvesters which is provided with revolving cutting-blades or knives turning horizontally upon a series of separate axes, one of each pair of cutters in the series operating reversely to the other.

My said invention relates, first, to the combination of a series of revolving cutting-blades, made to rotate in the same horizontal plane in intersecting circles, without overlapping, by approximating their axes so as to cause them to mesh or interlock in their movements without coming into contact with a metallic plate so secured by set-screws over the revolving blades as that its front edge may be adjusted and brought to bear closely and uniformly upon the upper surface of all the cutters in the series, said front edge being, by preference, shaped to correspond with the front edge of the finger-bar, and to extend out over and partially cover its fingers, the object of this part of my invention being to obviate the fatal objection to the use of overlapping cutters, arising from their tendency to choke and clog in movement, and to secure, at the same time, the great advantages obtained by presenting a uniform, well-defined, closely-adjusted opposing cutting-edge, against which they shall operate with an effect similar to that of a pair of shears, easily severing the interposed grass or grain, and effectually clearing themselves at every revolution.

It relates, in the second place, to the combination of a detachable covering-plate with the upper surface of the finger-bar, to slip under the knives or blades and partially embrace their axes, and, by covering the grooves or spaces in which the endless chain or the toothed wheels driving the cutters are placed, retain them in position, the object of this part of my invention being to shield and protect the gearing of the cutters from dirt and dust, and to secure the same in place, affording, at the same time, a ready means, by a simple detachment of the plate, of removing any of the cutters for the purpose of repair.

It relates, in the third place, to the connection and combination of the frame supporting the bed-plate, to which the cutter-bar is jointed, with the axle of the machine, by means of a "fifth-wheel" arranged vertically to permit an inclination of the axle in a vertical plane, independently of said frame, so that the cutter-bar may adjust itself to the inequalities of the ground, independently of the wheels and axle.

It relates, in the fourth place, to the use of a ball-and-socket or universal joint to connect the vertical driving-wheel carrying the endless chain, by means whereof motion is communicated to the cutters, with the axle of the machine, and to the combination with said wheel of lateral guides or guards projecting from the bed-plate frame on each side thereof, the object of this part of my invention being to permit an inclination of the axle, as above described, without affecting or changing the necessary vertical position of the driving-wheel.

It relates, in the fifth place, to the suspension of the bed-plate, to which the cutter-bar is jointed, from a curved arc sliding within a concentric encircling arc at one end, and from a slotted arm or bracket at the other, so as to permit a movement or inclination of the cutter about a central longitudinal axis, whereby it may be kept in a horizontal position at its different elevations for reaping or mowing.

Description of the Accompanying Drawing.

Figure 1, sheet 1, is a plan or top view of my improved harvester;

Figure 2, a plan view of the cutter-bar detached, with its upper outer covering-plate, N, fig. 1, removed, illustrating the form and arrangement of the revolving cutting-blades;

Figure 3 is a transverse vertical section of the finger-bar in line $x$ $x$ of fig. 2;

Figure 4, sheet 2, a vertical section through the machine in line $y$ $y$ of fig. 1, illustrating more fully the mechanism for driving the cutters;

Figure 5, a vertical section in line $z$ $z$ of fig. 1, illustrating the fifth-wheel connection, &c.;

Figure 6, an enlarged central longitudinal section through the hub of one of the wheels in line $z$ $z$ of fig. 1, illustrating my improved pawl and ratchet; and Figure 7, an end view of the bed-plate, to which the cutter-bar is hinged, detached from the running-gear, illustrating the manner in which it is suspended therefrom and connected thereto.

General Description.

A is the axle.

B B', the wheels of my improved machine. The wheels are loose upon the axle, but in moving forward they engage therewith to turn the same, through the instrumentality of a pawl and ratchet, (see fig. 6.)

This pawl consists of a tooth or pin, $b$, projecting from a plate, $c$, sliding in a dovetailed groove cut radially upon the face of the inner end of the hub.

A spring, $d$, upon the exterior of the hub, bears upon the outer end of the sliding plate $c$, and forces it inward, so that its projecting tooth $b$ shall bear upon an annular ratchet, $e$, secured about the axle and engaging therewith, prevents a forward movement of the wheels, independently of the axle, although they are left free to revolve backward, independently thereof. The ratchet is covered by an annular cap-plate, extending far enough to cover, also, the inner end of the hub.

C C' are bars secured to journal-boxes *f f*, figs. 1 and 5, embracing the axle A, near either end thereof, so as to leave the axle free to revolve therein.

To the front ends of these bars C C' the arms or shackle-irons of the pole or tongue D of the machine are pivoted.

The rear ends of the bars C C' are secured, at diametrically-opposite points, to an annular plate, E, at right angles thereto, so that said plate is thereby upheld in a vertical plane parallel to the axle A.

Upon or against this annular plate E is laid a second annular plate, E', corresponding thereto, the two forming a fifth wheel, being held together by bands or clasps *g g*, secured to the perimeter of the one and overlapping the perimeter of the other, so as to hold them securely face to face, and yet allow a free and easy revolution of the one upon the other.

The ends F' F'' of a curved plate or bar F are secured to this second annular plate E' of the fifth wheel at diametrically opposite points, so that it shall project therefrom at right angles, the points of attachment of the curved plate F being made to correspond with those of the bars C C' when the axle and said plate are in the same horizontal plane.

I is a bed-plate supporting the beveled wheels, by means whereof motion is transmitted from the axle to the cutters, as hereinafter described.

7 is an arc of metal of about two hundred and sixty degrees in extent, whose ends are secured to the outer end of the bed-plate I so that it shall project vertically therefrom at right angles thereto.

The perimeter of this arc is grooved circumferentially to receive a second concentric arc made to fit closely, yet turn freely in said groove. This outer arc 8 is secured to the curved plate F, near its end F', tangentially thereto, so as to project therefrom in a plane at right angles to the axle of the machine, and which, if extended, would cut the same a short distance within the wheel, as clearly illustrated in fig. 1.

The outer end of the bed-plate I is not only thus supported and suspended from the plate or bar F and its attached arc 8, but is left free to turn about a horizontal axis, so that it may be kept in a level or horizontal plane, whatever may be the inclination of said plate F.

The inner end of the bed-plate I is supported or suspended from beneath the opposite end of the curved plate F by means of a braced arm, 9, secured thereto and to the annular plate E' of the fifth wheel.

The lower end of this arm 9 is slotted and the bed-plate is secured thereto and upheld thereby by means of a screw or bolt passing through the slot and screwing into the edge of the bed-plate, as illustrated in figs. 4 and 5 of the drawing.

The slot and set-screw control and secure the movement of the bed-plate about its longitudinal axis permitted by the concentric arcs 7 and 8.

The fifth wheel E E' allows the axle to tip or turn in a vertical plane independently of the bed-plate I.

H is the finger-bar of my machine, formed of a steel bed-plate, to the under side of which is secured a series of shoes or runners, *h h*, which, projecting forward, constitutes its fingers, (see figs. 3, 1, and 2.) The inner end of the finger-bar H is hinged to the inner end of the bed-plate I, by means of a very strong, stout hinge, 10, fig. 2.

*i i*, figs. 2 and 3, are cylindrical studs or pins projecting from the finger-bar H, immediately in the rear of every alternate finger, to form axes for the cutter-wheels.

*k k* are toothed cutter-wheels, all of equal thickness and diameter, made to revolve upon each stud *i*. Upon these wheels are secured my improved cutters.

These consist of a series of blades, *m m*, usually four in number, projecting tangentially from the rim of a central disk or wheel, K, or from radial arms the equivalent thereof, said blades being curved or scythe-shaped, substantially as shown in the drawing, fig. 1, and beveled on the under side of their inner edge so as to make a cutting-edge on the upper inner side of the curve thereof.

The central disks K are secured to their toothed wheels *k* by means of screws, (see fig. 3,) so that they can be readily detached therefrom if necessary. They are perforated centrally to expose the upper ends of their pivot-posts *i i*. Their blades *m m* may be formed in one piece therewith, or be made separate therefrom and firmly secured thereto, and are so extended as that their extremities shall describe in their revolutions circles intersecting each other. They are so arranged in order on each wheel *k* with reference one to the other as that, although they all turn in the same plane, they will pass between each other without contact as they revolve in intersecting circles.

The axes of these cutter-wheels *k k* are so placed in relation to the fingers *h* as that the blades will extend and reach nearly to the extremities of the latter in their revolutions. The upper surface of the fingers are recessed to receive and guard the blades.

M is a plate of thin metal, made to fit upon the finger-bar under the cutting-blades, and so cut away along its front edge as to partially encircle the upper ends of the cutter-wheels *k k*. This plate serves to cover the interior of the finger-bar, within which the toothed cutter-wheels *k k* and their gearing operate.

N is a second plate, made to fit over the cutter-wheels upon the finger-bar. It is hinged to a similar plate covering the bed-plate I, (see fig. 1.) Its front edge is cut and fashioned to coincide with the front edge of the finger-bar H, as shown in fig. 1, and to extend out over the recesses formed in the upper faces of the finger-bars to protect the blades during their movements. It is secured by means of set-screws *s s* screwing into the upper ends of the axial posts *i i*.

A strip, *n*, (see fig. 3,) is laid under its rear edge to elevate it slightly from the under plate M and leave its front edge free to bear uniformly upon the cutters to present an opposite shearing-edge thereto, their contact therewith being regulated by means of the screws *s s* so as to make the same more or less close, as desired.

Power for driving the revolving cutters is obtained from the axle A of the machine by means of a toothed driving-wheel, P, thereon. This driving-wheel P is connected to the axle by a ball-and-socket joint, which permits an inclination of the axle independently of the wheel P.

*p* is the ball of the joint, placed loosely upon the axle A, and confined laterally between a fixed collar, 13, secured to the axle on one side, and a longitudinal key or feather, 15, fitted therein on the other. The ball is embraced by a socket or central aperture in the driving-wheel P, which is, however, provided with a projecting spur to pass into a transverse recess in the ball so as to prevent an independent rotary movement of the wheel upon the ball.

The independent rotary movement of the axle within the ball *p* is arrested at pleasure, and the axle made to turn said ball and its driving-wheel P by means of a clutch, 14, sliding longitudinally upon the axle over the key or feather 15, and whose inner face is notched (see fig. 1) to engage corresponding notches on the ball, (see fig. 4.)

The clutch 14 is operated by means of a lever, 16, fig. 5, pivoted upon the axle A near the wheel B', and confined between two fixed collars or flanges 17, formed or secured upon the axle on either side thereof, (see fig. 5.) The lower end of the lever is prolonged below the axle for a purpose hereinafter stated.

The lever 16 is connected with the clutch 14 by means of an arm, 18, secured to the lever, and whose free end is bent and forked to embrace a groove in the clutch, as shown in figs. 1 and 5.

Any accidental displacement of the lever and clutch when engaged or disengaged with the wheel P is prevented by means of an extended strap, 20, secured at either end to the bar C', and which passes over the arm 18 of the lever at right angles thereto, as shown in fig. 1.

This strap is slotted longitudinally with two parallel slots, and a pin projects upwardly from the arm 18, so as to work into the one slot or the other as the clutch is engaged or disengaged, the movement of the lever in operating the clutch being sufficient to cause the pin to pass from the one to the other when the lever is thrown forward, as shown in fig. 1.

A cord, 21, (see fig. 1,) is extended from the lower projecting end of the lever around a friction-roller, 22, on the supporting arc 7 of the bed-plate I, to a standard, 23, secured to the finger-bar H a little beyond its hinge, (see fig. 1.)

By pushing the lever back, the strain upon the cord 20, operating upon the standard 23, will suffice to elevate the free end of the cutter-bar from the ground in an inclined or even vertical position, for the purpose of transporting it from field to field, or to avoid obstructions when at work. The double slots in the strap-plate 20 permit the back-and-forth movement of the lever when the clutch 14 is either engaged or disengaged from the driving-wheel.

R R are guides projecting from the ends of the curved plate F, inwardly through the fifth wheel E E', on each side of the driving-wheel P, to steady the same in a vertical position.

S is an open-linked endless chain, whose links engage the teeth of the driving-wheel P, in front, and of a smaller toothed wheel, U, on a transverse shaft, W, in the rear.

This shaft W is supported centrally over the bed-plate I, in a plane parallel to the axle A, so as to revolve in bearings at one end upon a cross-bar, 12, secured diametrically within the arc 7, (see fig. 7,) and at the other upon a transverse bar parallel thereto, supported upon short standards G G, fig. 4.

The chain 20, carried over the wheels P and U, passes above the fifth wheel E E' over a toothed wheel on the reel-shaft Q, and by its engagement with said wheel causes said shaft to revolve.

A roller, t, placed upon the end of a spring, T, secured by its lower end to the annular plate E', bears with a constant elastic pressure against the under side of the chain, as illustrated in fig. 4, and furnishes a safety-guard against a breakage thereof in case of a sudden obstruction or undue strain upon the gearing.

2 is a large beveled cog-wheel, secured upon the shaft W, and gearing into a beveled pinion, 3, on the face of a large horizontal toothed wheel, 4, revolving upon a gudgeon or journal projecting from the bed-plate I, to which the finger-bar H is hinged.

5 is an endless open-linked chain, passing around or over, and engaging the teeth of the wheel 4, and of the entire series of toothed cutter-wheels k k, alternately on opposite sides of the latter, as clearly illustrated by dotted lines in fig. 1.

The passage of the chain within the finger-bar to and about the cutter-wheels is guided by means of a groove or channel formed for the purpose in the finger-bar with parallel strips of metal, or otherwise, as found expedient.

To provide for readily changing the speed of the cutters in converting the machine from a mower to a reaper, I place upon the shaft W a second toothed wheel, 6, of larger diameter than the toothed wheel U, interposing the same between the wheel U and the beveled wheel 2, so that by simply shifting the chain from the wheel U to the wheel 6 the speed of the cutters will be lessened, and *vice versa.*

A seat for the driver of the machine may be placed upon suitable standards secured to the front ends of the bars C, in front of the axle, within easy reach of the lever 16, by which the movement of the cutters is controlled, and the cutter-bar elevated or depressed.

I contemplate the substitution of spur-gearing for an endless chain in driving the cutter-wheels, although I prefer the latter.

Claims.

I claim as my invention—

1. The combination, substantially as herein described, of a series of revolving cutting-blades m m, arranged to describe intersecting circles in a common horizontal plane, and to intermesh without overlapping and without contact, as herein set forth, with an upper fixed covering-plate, presenting thereto a shearing-edge above, and a finger-bar, H, and under plate M beneath, the whole operating in the manner and for the purpose specified.

2. The fifth-wheel E E', interposed vertically between the axle of the machine and the frame and bed-plate carrying the finger-bar and its gearing, to connect the same and to permit an inclination of the axle independently of the frame and bed-plate, all substantially as and for the purpose herein set forth.

3. The combination of the driving-wheel P with the axle of the machine by means of an interposed ball-and-socket joint, formed and operating substantially in the manner herein specified.

4. The concentric sliding arcs 7 and 8, suspended from one end of the curved bar F, and the slotted arm or bracket 9 secured to the other end thereof and to the annular plate E' of the fifth wheel, when combined with the bed-plate I, to support the same and permit an inclination thereof about a central longitudinal axis, all substantially as and for the purpose herein set forth.

G. F. HAWLEY.

Witnesses:
DAVID A. BURR,
JOSEPH BART.